(12) United States Patent
Williams (10) Patent No.: US 9,197,071 B2
(45) Date of Patent: Nov. 24, 2015

(54) ENERGY STORAGE SYSTEM FOR SUPPLYING POWER TO LOADS OF A DRILLING RIG

(71) Applicant: Kevin R. Williams, Cypress, TX (US)

(72) Inventor: Kevin R. Williams, Cypress, TX (US)

(*) Notice: Subject to any disclaimer, the term of this patent is extended or adjusted under 35 U.S.C. 154(b) by 587 days.

(21) Appl. No.: 13/652,636

(22) Filed: Oct. 16, 2012

(65) Prior Publication Data
US 2013/0271083 A1    Oct. 17, 2013

Related U.S. Application Data

(63) Continuation-in-part of application No. 13/467,565, filed on May 9, 2012, now Pat. No. 9,065,300, which is a continuation-in-part of application No. 13/419,125, filed on Mar. 13, 2012, now Pat. No. 9,059,587, which is a continuation-in-part of application No. 12/757,234, filed on Apr. 9, 2010, now Pat. No. 8,446,037.

(60) Provisional application No. 61/266,734, filed on Dec. 4, 2009.

(51) Int. Cl.
| H02J 3/00 | (2006.01) |
| H02J 7/00 | (2006.01) |
| H02J 3/28 | (2006.01) |
| H02J 3/38 | (2006.01) |
| H02J 9/06 | (2006.01) |
| H02J 3/30 | (2006.01) |
| H02J 3/32 | (2006.01) |

(52) U.S. Cl.
CPC ... *H02J 7/00* (2013.01); *H02J 3/28* (2013.01); *H02J 3/30* (2013.01); *H02J 3/32* (2013.01); *H02J 3/381* (2013.01); *H02J 9/06* (2013.01); *Y02E 60/16* (2013.01)

(58) Field of Classification Search
CPC ................. H02J 3/28; H02J 3/30; H02J 3/32; H02J 3/381; H02J 7/00; H02J 9/06; Y02E 60/16
USPC ............................................. 307/84; 320/128
See application file for complete search history.

(56) References Cited

U.S. PATENT DOCUMENTS

| 4,590,416 | A | 5/1986 | Porche et al. |
| 7,633,248 | B1 | 12/2009 | Williams |
| 2008/0203734 | A1 | 8/2008 | Grimes et al. |
| 2009/0195074 | A1 | 8/2009 | Buiel |
| 2009/0312885 | A1 | 12/2009 | Buiel |
| 2011/0074165 | A1 | 3/2011 | Grimes et al. |

*Primary Examiner* — Hal Kaplan
(74) *Attorney, Agent, or Firm* — Egbert Law Offices, PLLC (57) ABSTRACT

A system for supplying power to a drilling rig has an engine/generator with an output line so as to transfer power therefrom, an energy storage system connected to the engine/generator, and a load connected to the energy storage system such that power from the energy storage system is directly transferred to the load and such that power from the engine/generator is electrically isolated from the load. The engine/generator has a capacity greater than an maximum power requirement of the load. The energy storage system can include at least one battery.

19 Claims, 8 Drawing Sheets

ENERGY STORAGE SYSTEM FOR SUPPLYING POWER TO LOADS OF A DRILLING RIG

CROSS-REFERENCE TO RELATED APPLICATIONS

The present application is a continuation-in-part of U.S. patent application Ser. No. 13/467,565, filed on May 9, 2012, and entitled "Dual Fuel System and Method of Supplying Power to Loads of a Drilling Rig", presently U.S. application Ser. No. 13/467,565 is a continuation-in-part of U.S. patent application Ser. No. 13/419,125, filed on Mar. 13, 2012, and entitled "System and Method of Supplying Power of Loads of a Drilling Rig", presently U.S. application Ser. No. 13/419, 125 is a continuation-in-part of U.S. patent application Ser. No. 12/757,234, filed on Apr. 9, 2010, and entitled "Energy Storage System for Peak-Shaving of Drilling Rig Power Usage", presently U.S. patent application Ser. No. 12/757, 234 claimed priority from U.S. Provisional Patent Application No. 61/266,734, filed on Dec. 4, 2009.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to energy systems as used on drilling rigs. More particularly, the present invention the relates to drilling rigs that are supplied with power from a dual fuel engine/generator. Additionally, the present invention relates systems for supplying power and for storing power through the use of batteries and other energy storage systems.

2. Description of Related Art Including Information Disclosed Under 37 CFR 1.97 and 37 CFR 1.98.

In the field of oil well drilling, a significant amount of power is required during the drilling activity. The power requirements, as used on a drilling rig, serve to supply the drawworks, the mud pumps, the top drives, the rotary tables, the dynamic braking systems and other peripheral loads. In oil well drilling activities, oversized power systems are often utilized so as to meet the "peak" power requirements.

Historically, the number of engines/generators that are used and are typically online are more than the required load of the application due to the redundancy and necessary peak KW and VAR demand during certain aspects of the operation. In particular, these peak demands are during the "tripping" of the pipe or drill stem.

During normal operations, there is a base load of lighting, pumps, agitators, mixers, air compressors, etc. This base load can make up typical loads of 400-600 kilowatts. The mud pumps, top drives and rotary tables contribute another fairly consistent KW demand. This demand will vary based on the particular well, depth of drilling, and material being drilled.

During oil well drilling activities, the most intermittent load is the drawworks. This intermittent load is directed toward the peak demand during the raising or lowering of the drill pipe upwardly and downwardly in the well. This peak demand can have loads as much as two to three times the base loads of the other demands on the drilling rig.

When drilling and at times when the downhole tool has to be inspected or changed, it is required to pull all of the drill pipe from the hole. This distance can be 10,000 feet or more. The drill pipe must be taken apart and stacked as it is being removed. After repair or replacement, the reverse procedure must take place so as to reinsert all the components back to the desired depth. During the tripping in or out of the hole, the driller (operator) demands extreme power consumption and very quick bursts as the driller raises (or lowers) the string of drill pipe. Since there is a limitation on the height of the drilling mast, the operator must lift the sections in increments and unscrew the different sections. These sections are stacked one at a time. This process is repeated during the reinsertion of the drill pipe back into the hole. This process is referred to as "making a trip". The intermittent high demand occurs when this load (300,000 pounds or more) occurs over and over again. The load is inconsistent since the weight of the drill stem becomes less and less as sections are removed. The base load requirements for the drilling rig are approximately 600 to 800 KW. The peak demand can be 1.5 MW and as high as 2.0 MW. Because of these power requirements, the emissions of the engines/generators for a typical land rig are quite high. Newer engines can have much lower NOx output than earlier engines. There are also large amounts of carbon dioxide emissions. The fuel consumption during these intermittent demands can be quite significant.

On mechanical rigs, power from the engines drives the rig equipment either directly, through a clutch, or through a torque converter. Electric rigs use engine power to drive one or more generators. The generated electricity is then used to operate motors for the larger equipment on the rig. There are three types of electric rigs, direct current, silicon-controlled rectifiers, and variable frequency drives. Direct current rigs have a DC generator that supplies power to DC motors. These are the oldest types of drive systems. The silicon-controlled rectifier systems produce AC power from the generators and then changed to DC by switchgear in order to power DC motors. This allows for more power to be generated by smaller generators. Variable frequency drives are the newest kind of rig which utilize variable speed AC motors so as to allow for even more power output for the same sized equipment.

There are various ignition methods that are used in the reciprocating internal compression engines used as the generator for electric drilling rigs. These ignition methods include compression ignition and spark ignition. Diesel engines are one type of compression ignition engine. Combustion air is first compression heated in the cylinder and diesel fuel oil is then injected into the hot air. Ignition is spontaneous because the air temperature is above the autoignition temperature of the fuel. Spark ignition initiates combustion by the spark of an electrical discharge. This engine is a dedicated natural gas engine and offers the greatest fuel cost savings and emission reductions in comparison to diesel engines.

Although all diesel-fueled engines are compression-ignited and all gas-fueled engines are spark-ignited, natural gas can be used in a compression ignition engine if a small amount of diesel fuel is injected into the compressed natural gas/air mixture so as to burn any mixture ratio of natural gas and diesel oil. This type of engine is often referred to as a "dual fuel" engine. Compression ignition engines usually operate at a higher compression ratio (ratio of cylinder volume when the piston is at the bottom of its stroke to the volume when it is at the top) than spark ignition engines because fuel is not present during compression. Hence there is no danger of premature autoignition. Since engine thermal efficiency rises with increasing pressure ratio (and pressure ratio varies directly with compression ratio), compression ignition engines are more efficient than spark ignition engines. This increased efficiency is gained at the expense of poorer response to load changes and the need for a heavier structure to withstand the higher pressures.

Natural gas generators are being used for land-based drilling applications and offer unique advantages in reduced exhaust emissions and significant fuel cost savings compared to more commonly-used diesel engine generators. Natural gas engine generators make it simpler to meet ever more stringent emissions regulations, particularly for oxides of nitrogen (NOx). Additionally, natural gas engine generators have the added advantage of accepting wellhead gas for further cost benefits. Diesel engines have much better load characteristics when compared to natural gas engines and therefore respond more reliably to changes in loads as drilling functions abruptly demand power requirements, such as tripping of the drill string.

The dual fuel engine is a compression ignition engine that operates on gaseous fuels while maintaining some liquid fuel injection to provide a deliberate source for ignition. Such a system is usually designed to minimize use of diesel fuel by replacing it with various gaseous fuels and their mixtures while maintaining satisfactory engine performance. Dual fuel engines offer reduced fuel costs and emissions benefits compared to conventional diesels. However, this benefit can be limited since the generator must occasionally switch from higher volume ratios of natural gas back to higher volume ratios of diesel fuel to meet the block loading and load-shedding conditions forced by changing rig power demands.

There are several approaches for dual fuel engine technologies. One approach is a dedicated dual fuel design which uses a direct metered cylinder charge of natural gas so as to permit natural gas levels approaching 99% with extremely low pilot fuel levels (near 1%). This is a purpose-built engine and consequently is very expensive. This engine is best suited for steadier, regulated loads. Typically, this type of engine is ill-suited for the dynamic loads of drilling rigs.

Another type of dual fuel engine/generator is the after market "fumigation system" adapted to almost any diesel engine brand. As such, each engine will have different displacements, diesel fuel injection systems, compression ratios, turbocharger boosts, intake manifold systems, cooling systems, and operate at different speeds. As such, the fuel ratio with a fumigation system will be inherently different on almost every engine. An important aspect of achieving optimum substitution with a fumigation system is reaching the "sweet spot" range of the particular engine by maintaining the ideal load.

There are problems associated with conversion of a conventional diesel engine to dual fuel operation. At light loads, dual fuel engines tend to exhibit inferior fuel utilization and power production efficiencies. There is higher unburned gaseous fuel and carbon monoxide emissions relative to corresponding diesel performance. Operation at light loads is also associated with greater cyclic variation in performance parameters, such as peak cylinder pressure, torque and ignition delay. This has narrowed the effective working range for dual fuel applications in the past. These trends arise mainly as a result of poor flame propagation characteristics within the very lean gaseous fuel/air mixtures and the origination of the various ignition centers of the pilot. The quality of natural gas used to fuel a converted engine, with respect to its percentage makeup of component gases, will directly affect power, efficiency, emissions, and longevity of the engine. In these fumigation-type dual fuel systems, there are several concerns relative to the natural gas/diesel ratio, the knock limit, and the maximum load rating. Gas composition, engine load factor, engine control strategy, engine condition, charge-air temperature and ambient conditions (temperature and altitude) govern the upper limit of gas substitution in most cases. Gas ratio is typically limited by the knock limit of the air-natural gas mixture at a particular engine load. In general terms, high quality gas and moderate engine loads (up to 70% of stand-by rating), will typically yield gas ratios between 30-70%. Lower quality natural gas, high engine loads, high charge-air temperatures and high altitude (or a combination of these factors) will typically limit gas ratio.

The gas substitution that is possible varies depending on gas quality, engine design, engine model and condition, engine load factor, charge air temperature (aftercooling), and ambient conditions (altitude and temperature), but should never exceed 70%, even under the most ideal conditions. In general, high quality gas (over 95% $CH_4$), combined with moderate engine power levels and low temperature aftercooling will typically yield gas ratios in the 60% to 70% range, although there are factors that can still limit this value to much lower levels. Lower quality gas, combined with high manifold air temperature and/or higher engine loads, will typically result in gas substitution closer to 50% or lower.

In most applications, engine knock (detonation) will be the limiting factor in determining maximum gas ratio. In most cases, short duration knock will not cause harm to the engine. However, extended operation in a knocking condition may result in engine damage or failure. A knocking condition can be diagnosed both audibly and by using the bi-fuel system vibration sensor data. Data from the engine vibration sensors should be monitored closely during the setup procedure to confirm proper engine operation. If knocking is detected during bi-fuel operation, the engine should be rapidly switched to 100% diesel operation. To prevent recurrence of knocking, a reduction in gas ratio and/or a reduction in engine load will be required.

Engines that are converted to dual fuel operation are typically utilized for peak shaving, prime power, co-generation, or other high use applications. It is important for the installing technician to understand the power rating system used for most high-speed diesel engines, and the associated duty-cycles applicable to each. Most manufacturers of high speed (1200-1800 rpm) diesel engines and generator sets publish stand-by, prime and continuous ratings. The stand-by rating is reserved for emergency operation only and represents the highest horsepower or work level that can be sustained for a limited period of time. In most applications, the stand-by rating will not be used for bi-fuel operation. The prime rating typically allows for unlimited hours of use, with a variable load, up to the prime rated output. The continuous rating is the most conservative rating, and is reserved for unlimited hours at a constant load. In general, bi-fuel mode is reserved for operations at or below the prime rating of the machine. The higher the number of hours of intended use and the more constant the load rate, the more conservative the rating should be.

Figure 1:
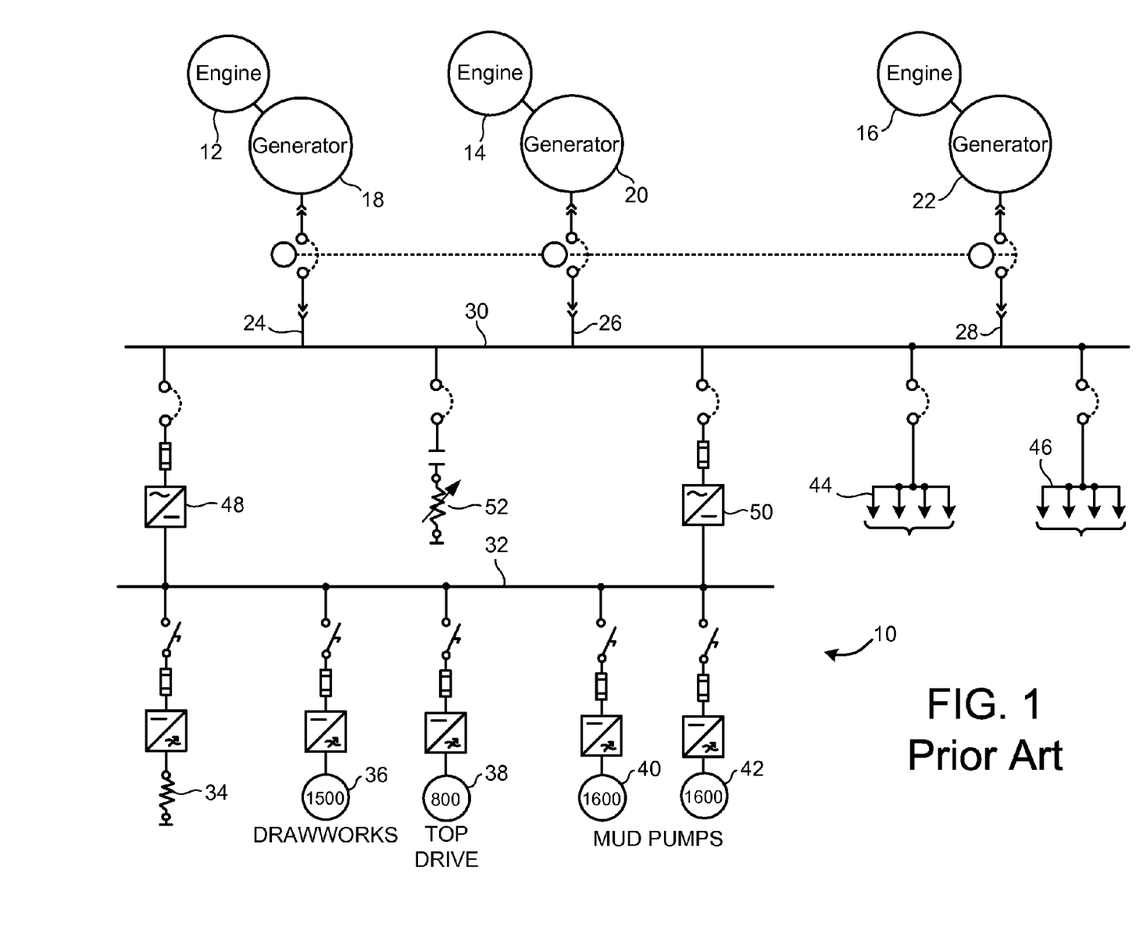
FIG. 1 is a schematic diagram of a prior art power system for the loads of a drilling rig.

Referring to FIG. 1, there is shown a prior energy system for use with the various loads of a drilling rig. In particular, the energy system 10 includes engines 12, 14 and 16. Engine 12 operates generator 18. Engine 14 operates generator 20. Engine 16 operates generator 22. The generators 18, 20 and 22 will pass AC power along respective lines 24, 26 and 28 to a common AC bus 30. Typically, the various engine/generators, as shown in FIG. 1, are diesel engines. However, it is possible that such engine/generator combination could be also natural gas engine/generators.

A common DC bus 32 is illustrated as connected to the various components 34, 36, 38, 40 and 42 of the drilling rig. Load 34 is a DB module. Load 36 is the drawworks. Load 38 is the top drive. Loads 40 and 42 are the mud pumps. Each of these loads 34, 36, 38, 40 and 42 are switchably connected to the common DC bus 32. The AC bus is configured to supply power to the hotel loads 44 and 46 of the drilling rig. Hotel loads 44 and 46 can include air-conditioning and heating, lighting, and other energy requirements of the drilling rig. A first rectifier 48 is connected between the AC bus 30 and the DC bus 32. Rectifier 38 serves to convert the AC power to DC power. Similarly, the other rectifier 50 is connected between the AC bus 30 and the DC bus 32, also to convert the AC power to DC power. The DC power is properly utilized by the loads 34, 36, 38, 40 and 42. In FIG. 1, it can be seen that there is a resistive load bank 52 that is connected, by a switch, to the AC bus. As such, any excess energy that is provided by the various engine/generator combinations can be burned as heat by the resistive load bank 52.

Currently-used natural gas engine/generators that are used to power a drilling rig must be controlled to accept a lower level of transient response than is possible with diesel power. This requires the estimating of the transient response capability of the natural gas engine/generator and the determining of how the rate of application or rate of load removal can be reduced to make the system work. Unfortunately, this results in reduced power rates and decreased rig productivity, even with the use of a ballast load or the resistive load bank 52. A typical approach is to create a load profile of the rig's expected operations in terms of power required versus time. The creation of this profile for both the desired "ideal" loading rates and for the drill site's minimum requirements will establish the minimum and maximum loading conditions for the rig powerhouse. Gas engine/generator operation is then controlled within these minimum and maximum values to attempt to minimize power interruptions from forced generator failure.

Figure 2:
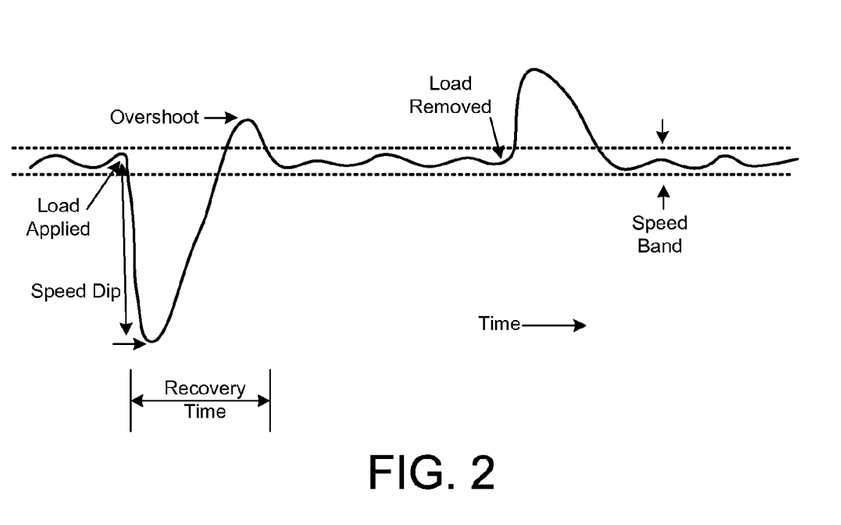
FIG. 2 is a graph showing the transient response of a natural gas engine/generator as measured by a percentage frequency change and duration.

FIG. 2 shows the transient response of the natural gas engine/generator during the adding of load or the shedding of load. All gensets have a response to such added load or shredded load. Changes in voltage and frequency associated with this transient response is dependent on the generator type (e.g., diesel compression versus natural gas spark-ignited engine) and the magnitude of the load change, where these step loads are described as some percentage of full rated power.

The transient response and steady state stability of generator set engines can vary because of a number of factors, such as engine model, engine speed, aspiration, power factor, governor and the presence of an idle circuit. Diesel engines have a short mechanical path between the governor actuator and the fuel delivery system to the combustion chamber. This system responds quickly and in a more stable manner to load change requests from the governor. Whenever a large load is added to a generator set, engine speed temporarily slows down, or dips, before returning to its steady-state condition. When a load is removed, engine speed increases, or overshoots, temporarily. Since generator frequency is determined by engine RPM, the quality of electrical power is impacted. The measurements of these temporary speed changes is referred to as "transient response".

One of the problems with the use of the dual fuel engine/generator is the variations in engine/generator operation and performance that can occur because of various factors. These factors can include the dynamic engine loading due to variable methane content when operating under field gas, the engine/generator is less responsive nature and has poor transient response of the dual fuel compared to diesel engine/generators, and the changing dynamic loads when operating at high gas substitution rates with dual fuel engine/generators. As a result, the dual fuel engine/generator is less efficient and less reliable. Whenever an engine/generator operates at less than full capacity, the efficiencies are reduced. As such, a need has developed so as to be able operate such engine/generators at nearly 100% capacity so as to achieve maximum efficiency.

In the past, various patents and patent publications have been issued that relate to power usage and the control of such power usage by drilling rig systems. For example, U.S. Pat. No. 4,590,416, issued on May 20, 1986, to Porche et al., teaches a closed loop power factor control for power supply systems. This power factor controller for alternating current/direct current drilling rigs. The power factor controller utilizes a uniquely controlled, unloaded, over-excited generator to reactive power to maintain the rig's power factor within prescribed limits during peak demand operations. In particular, this method includes the step of: (1) sensing the instantaneous system power factors; (2) comparing the sensed instantaneous power factor to a prescribed power factor; (3) forming a power factor control signal indicative of the difference between the sensed power factor and the prescribed power factor; (4) providing a field excitation signal to an unloaded over-excited generator operated in the motor mode in proportion to the power factor control signal so as to cause the over-excited generator to generate the requisite reactive power to correct the system's power factor to the prescribed power factor; and (5) coupling the output of the over-excited generator to the power system.

U.S. Patent Publication No. 20088/0203734, published on Aug. 28, 2008 to Grimes et al., describes a wellbore rig generator engine power control system. This system controls power load to a rig engine. This system includes a sensor for controlling a rig engine and a sensor for sensing the exhaust temperature of a rig engine. The sensor is in communication with the controller so as so as to provide the controller with signals indicative of the exhaust temperature. The controller maintains power load to the rig engine based on the exhaust temperature.

U.S. Patent Publication No. 2009/0195074, published on Aug. 6, 2009 to Buiel, shows an energy supply and storage system for use in combination with a rig power supply system. This system includes a generator start/stop and a power output control. A bi-directional AC/DC converter converts the AC power generated by the engine-generator. The power supply is adapted to draw energy from the storage system when the rig motor exceeds the capacity of the generator.

U.S. Patent Publication No. 2009/0312885, published on Dec. 17, 2009 to Buiel, teaches a management system for drilling rig power supply and storage. This management system has a power generator coupled to rig loads. The power generator is used for powering and charging the storage system. The energy storage system draws energy from the storage system in periods of high power requirements and distributes excess energy to the storage system in periods of lower power requirements. The output of the power generator is managed based on the rig power usage wherein the output is increased when the rig power requirements are above a preselected threshold and wherein the output is decreased when the rig power requirements fall below a preselected threshold.

One of the problems of the Buiel applications is that the power generator supplements and complements the power requirements of the load in order to satisfy the rig power demand. As such, when rig power demand is high, the generators will operate with relatively high dynamic loads. The operation of the engine/generator can vary significantly between low operating requirements and high operating requirements. As such, the generators are unable to achieve a near steady-state power output level. This reduces the fuel efficiency and economy, and increases the emissions from such generators. As such, the Buiel publications fail to allow the engine/generator to operate in a generally steady-state power output level.

U.S. Patent Publication No. 2011/0074165, published on Mar. 31, 2011 to Grimes et al., describes a system for controlling power load to a rig engine of a wellbore rig. The system includes a controller for controlling the rig engine and a sensor for sensing the exhaust temperature of the rig engine. The sensor is in communication with the controller for providing to the controller signals indicative of the exhaust temperature. The controller maintains the power load to the rig engine based on the exhaust temperature.

The Grimes publication also uses the engine/generator to complement or supplement the load requirements. As such, when the battery levels are low, additional power is transferred directly from the engine/generator to the load. The engine/generator will have to respond to high dynamic loads and low dynamic loads. As such, the engine/generator will be unable to operate in near steady-state conditions. This creates inefficiencies and unreliability. It also reduces fuel economy and increases emissions.

U.S. Pat. No. 7,311,248, issued on Dec. 15, 2009 to the present inventor, provides a system for managing energy consumption in a heave-compensating drawworks. This system includes a power supply, a winch drum connected to the power supply so as to receive power from the power supply, a flywheel connected to the winch drum and to the power supply, and a controller connected to the power supply and to the winch drum for passing energy to and from the flywheel during an operation of the winch drum. The flywheel includes a disk rotatably coupled to an AC motor. This power supply includes a first pair of AC motors operatively connected on one side of the winch drum and a second pair of AC motors operatively connected on an opposite side of the winch drum.

It is an object of the present invention to provide a system for supplying power to a drilling rig wherein the power to the load of the drilling rig is provided substantially entirely by an energy storage system.

It is another object of the present invention to provide a system for supplying power to a drilling rig which allows the engine/generators to operate under steady-state conditions.

It is another object of the present invention to provide a system for supplying power to a drilling rig which reduces fuel consumption and reduces emissions.

It is another object of the present invention to provide a system for supplying power to a drilling rig which reduces the vulnerability of the generator's output to variations in wellhead gas flow rates and methane content.

It is another object of the present invention to provide a system for supplying power to a drilling rig which reduces the amount of wasted fuel that have been previously lost in resistive load banks.

It is still another object of the present invention to provide a system for supplying power to a drilling rig which enhances the reliability of the operation of the engine/generators.

It is a further object of the present invention to provide a system for supplying power to a drilling rig which can serve as an uninterruptable power supply for use during fuel interruptions.

It is still a further object of the present invention to provide a system for supplying power to a drilling rig which eliminates the requirement for auxiliary engine/generator sets.

It is still a further object of the present invention to provide a system for supplying power to a drilling rig which reduces the cost of batteries while enhancing the responsiveness of the batteries to high dynamic loads.

It is still a further object of the present invention to provide a system for supplying power to a drilling rig which allows the engine/generators to be easily adapted to supply power directly to the loads in the event of failure of the energy storage system.

These and other objects and advantages of the present invention will become apparent from a reading of the attached specification and appended claims.

BRIEF SUMMARY OF THE INVENTION

The present invention is a system for supplying power to a drilling rig that has an engine/generator with an output line so as to transfer power therefrom, an energy storage system connected to the engine/generator, and a load connected to the energy storage system such that power from the energy storage system is transferred to the load and such that power from the engine/generator is isolated from the load. The output line of the engine/generator is connected or interconnected to the energy storage system such that power from the engine/generator is directed to the energy storage system.

The engine/generator has a capacity greater than an average power requirement of the load. The energy storage system has a capacity greater than a maximum power requirement of the load.

The output line of the engine/generator is connected to an AC bus. The output line of the energy storage system is connected to a DC bus. The load is connected to the DC bus. A rectifying means is connected between the AC bus and the DC bus for passing DC power from the AC bus to the DC bus.

In the present invention, the engine/generator can be a diesel fuel engine/generator, a dual fuel engine/generator, a natural gas engine or combinations thereof.

The energy storage system can include at least one battery. In the preferred embodiment of the present invention, this battery can include a first battery connected to the load so as to supply power directly to the load and a second battery connected in series to the first battery. The engine/generator supplies power to the second battery. Also, in the preferred embodiment of the present invention, the first battery is a lithium ion battery. The second battery can be a lead acid battery. The first battery can have a capacity of approximately 25% of the power requirements of the load. The second battery can have a capacity of approximately 75% of the power requirements of the load. The energy storage system can also be a flywheel and a capacitor.

In the present invention, the engine/generator can operate at least at 80% of a maximum output of the engine/generator. As such, the engine/generator can operate near to a maximum capacity under steady-state operating conditions. The engine/generator can be turned off when not operating. As such, less fuel is consumed, emissions are reduced, and reliability is improved.

The foregoing Summary of the Invention section is intended to describe, with particularity, the preferred embodiment of the present invention. It is understood that modifications to this preferred embodiment can be made within the scope of the present invention. As such, this section should not construed, in any way, as limiting of the broad scope of the present invention. The present invention should only be limited by the following claims and their legal equivalents.

DETAILED DESCRIPTION OF THE INVENTION

Figure 3:
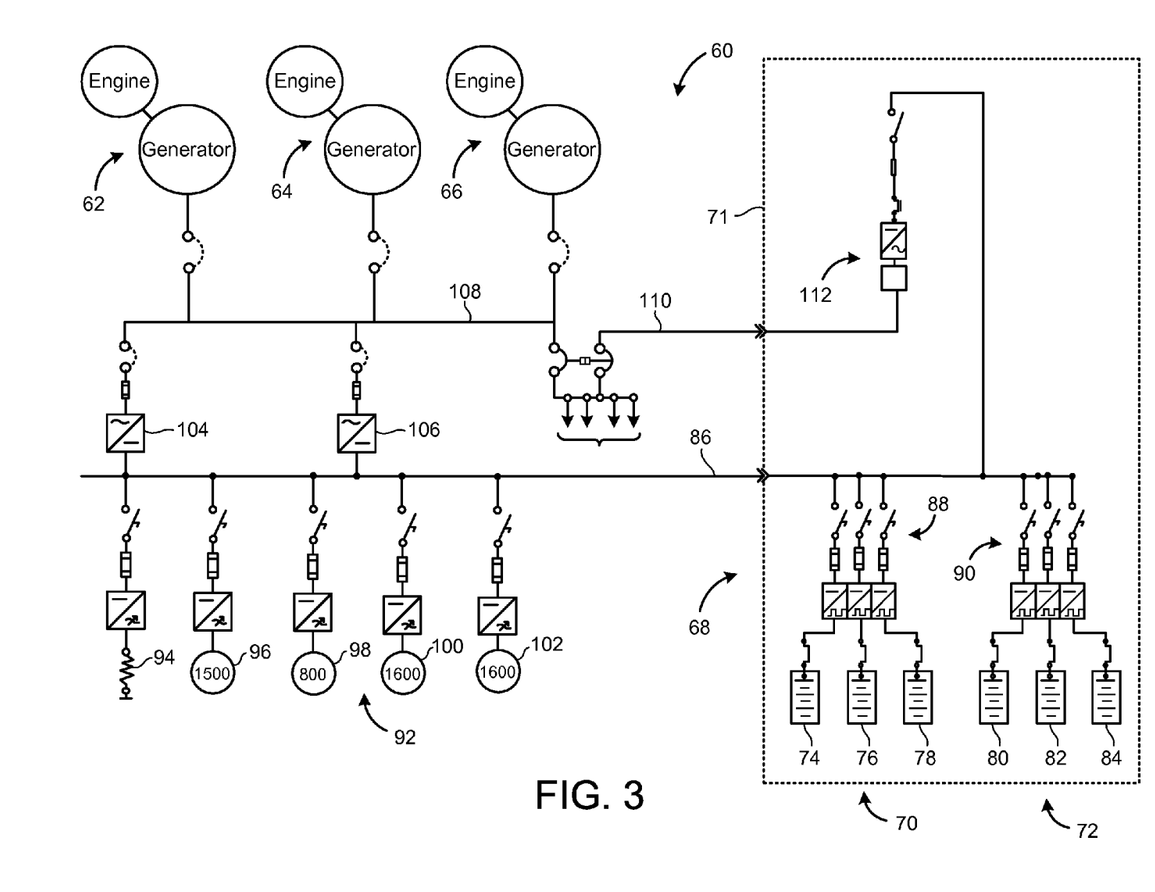
FIG. 3 is a schematic diagram showing the system for supplying power to a drilling rig in accordance with the preferred embodiment of the present invention.

Referring to FIG. 3, there is shown the system 60 for supplying power to a drilling rig in accordance with the preferred embodiment of the present invention. The system 60 includes a first engine/generator set 62, a second engine/generator set 64 and a third engine/generator set 66. For the purpose of illustration, the first engine/generator set 62 can be a dedicated dual fuel system which can be supplied with diesel fuel and with natural gas. The engine/generator set 62 can include a metering system so that a proper proportion of diesel fuel from a diesel fuel supply and natural gas from a natural gas supply are provided directly to the engine in a fixed ratio. As such, the natural gas supply will have a constant quality and methane contact. Since the engine/generator set 62 is a dedicated dual fuel engine/generator, it can operate with 99% natural gas and 1% diesel fuel.

Also, further for the purpose of illustration, the engine/generator set 64 can be a fumigation-type system. In these fumigation-type systems, the diesel fuel and the natural gas are connected so as to flow together to the engine/generator set 64. The natural gas supply can be a wellhead gas or any other supply of gas. Since the fumigation-type system is utilized for the engine/generator set 64, it is not important to have a fixed ratio of natural gas and diesel fuel. In fact, through the fumigation-type system, varying ratios of natural gas to diesel fuel can be supplied to the engine/generator set 64. This fumigation-type system allows the inconsistent nature and content of wellhead gas to be supplied directly to the engine/generator set 64. Typically, the fumigation-type dual fuel engine/generator set will utilize approximately 50% to 70% natural gas with between 30% and 50% diesel fuel.

The engine/generator set 66 can be diesel fuel engine/generator. As such, it will not require a supply of natural gas. Such diesel fuel engine/generator sets are readily available for application at the wellhead.

It should be noted that engine/generator sets 62, 64 and 66 can have a wide variety of configurations. As such, the description of the "dual fuel" systems and the "diesel" systems should not be construed as limiting of the types of engine/generator sets that are suitable for the system 60. It is believed that the dual fuel system would be the preferred embodiment of the present invention. However, within the concept of the present invention, various other types of engine/generator sets could also be employed.

FIG. 3 shows an energy storage system 68. Energy storage system 68 is positioned on a skid 71 that can be suitably transported or placed adjacent to the drilling rig. The energy storage system 68 is illustrated as including two sets 70 and 72 of batteries. Set 70 includes batteries 74, 76 and 78. Set 72 includes batteries 80, 82 and 84. The batteries 74, 76, 78, 80, 82 and 84 can have various configurations. The sets 70 and 72 of the batteries are provided so as to connect with a DC bus 86. Suitable switches 88 and 90 are associated with sets 70 and 72 so as to selectively transfer power from the respective batteries to the DC bus 86. Although the batteries 74, 76, 78, 80, 82 and 84 are illustrated, it is possible, within the concept of the present invention, that items, such as flywheels and/or capacitors, could be used in place of the batteries. The batteries would be the preferred form of the present invention.

The load 92 is interconnected to the DC bus 86. The load 92 can include a load bank 94, a drawworks 96, a top drive 98 and mud pumps 100 and 102. Each of the loads 94, 96, 98, 100 and 102 have a variable frequency drive connected thereto. Ultimately, each of the loads 94, 96, 98, 100 and 102 can be switchably connected to the DC bus 86. The variable frequency drives are systems for controlling the rotational speed of AC motors by controlling the frequency of electrical power supplied to the motor. The switches are respectively interposed between the DC bus 86 and the respective loads 94, 96, 98, 100 and 102. A hotel system could also be connected to the DC bus 86.

Suitable rectifiers 104 and 106 will extend between the AC bus 108 and the DC bus 86. The rectifiers 104 and 106 can convert the AC power provided on the AC bus 108 to DC associated with the DC bus 86.

Within the concept of the present invention, the system 60 directly connects the engine/generator sets 62, 64 and 66 along line 110 to the energy storage system 68. As such, the engine/generator sets 62, 64 and 66 will supply power directly to the battery sets 70 and 72. While the power is being supplied, the switches 88 and 90 are closed. As such, power will flow through the output lines associated with the engine/generator sets 62, 64 and 66 to the battery sets 70 and 72 such that the batteries are supplied with power. The DC bus 86 supplies power directly from the battery sets 70 and 72 to the load 92. During the supply of power from the battery sets 70 and 72 to the load 92, the engine/generator sets 62, 64 and 66 are electrically isolated from the load 92. As such, the power requirements of the load 92 are entirely supplied by the energy storage system 68. In the event of failure of the energy storage system 68, the power can be directed from the engine/generator sets 62, 64 and 66 to the load 92 by way of the connection of the AC bus 108 and the DC bus 86.

It is important, within the concept of the present invention, that the power supplied from the energy storage system 68 is greater than the maximum requirements of the load 92. As such, during normal operation, it will never be necessary to directly transfer energy from the engine/generator sets 62, 64 and 66 to the load 92. Since the energy storage system 68 is directly connected to the engine/generator sets 62, 64 and 66, all of the power requirements for the battery sets 70 and 72 are supplied by the engine/generator sets 62, 64 and 66. As the batteries discharge to the load 92, the engine/generator sets 62, 64 and 66 will continuously supply power to the batteries. Suitable control and monitoring equipment can be associated with the battery sets 70 and 72. When a sufficient amount of power has been discharged from the battery sets 70 and 72, the engine/generator sets 62, 64 and 66 can be actuated so as to recharge the batteries of the energy storage system 68. Under these conditions, the engine/generator sets 62, 64 and 66 can operate near a maximum capacity (at least 80% of the rated capacity). As such, the engine/generator sets will be operating at near optimal conditions. This maximizes fuel efficiency and minimizes emissions. It is recognized that engine/generators, when operating at low speeds, actually consume more fuel and create greater emissions. The present invention, by utilizing the energy storage system having a capacity greater than the maximum requirements of the load 92, avoids the need for the supplementing or complementing the power produced from the energy storage system 68. Quite clearly, during those times when the energy storage system 68 is fully recharged, the engine/generator sets 62, 64 and 66 will be turned off and, as such, consume no fuel nor produce any emissions. Typically, in order to maintain the operation of the load 92, the engine/generator sets 62, 64 and 66 should have a total capacity greater than an average power requirement of the load. As such, there would be no possibility of the batteries of the energy storage system 68 as being discharged to the point where the load 92 will not have sufficient power.

The system 60 of the present invention is designed with the needed energy and power to satisfy the load 92 of the drilling rig. Since the energy storage system 68 has adequate energy capacity and power rating, it can be connected to the DC bus 86 so as to stabilize the DC bus 86 against changing power demands as commanded by the various drilling operations associated with the load 92. The output from the energy storage system 68 directly satisfies the power demand of the drilling rig. The engine/generator sets 62, 64 and 66 are operated to maintain the state-of charge of the energy storage system 68.

The energy storage system 68 is continually cycling with bi-direction power flow in response to the power state of the load 92 in order to permit engine/generator sets 62, 64 and 66 to operate at a near steady-state power output level. The use of this energy storage system 68 provides the ability to operate the engine/generator sets 62, 64 and 66 at a high load point (above 80%) or be turned off. During the off condition, the rig power demand is provided solely by the energy storage system.

The use of the energy storage system 68 serves to peak shave rig loads so as to permit near steady-state engine generator operation. This leveling-out of the engine generator operation reduces the criticality of genset control for the: (1) dynamic engine loading due to variable methane content when operating under field gas; (2) changing dynamic loads when operating with engine/generators that are less responsive and have poorer transient response; and (3) changing dynamic loads when operating at high gas substitution rates with dual fuel engine generators.

It should be noted that the voltage deviation from energy storage system 68 will deviate from nominal voltage. This is often referred to as "voltage float". This voltage float is relatively small over all operational ranges of the state-of charge of the energy storage system 68. This deliberately-created small voltage float from the energy storage system 68 advantageously serves to support and stabilize the voltage on the DC bus associated with load 92. The battery system is designed to have an ample energy capacity (ranging from 1000 kWh to 3000 kWh). Such batteries have a well-defined voltage versus state-of-charge behavior. The large energy capacity is selected to uniquely minimize depth-of-discharge swings. This correspondingly minimizes voltage swing on the DC bus 86. For virtually all rig-loading events, voltage deviations are held within ±10%. The energy storage system 68 acts as a buffer to stabilize the DC bus within the same control points.

The favorably stabilized voltage of the DC bus 86 permits the engine/generator sets 62, 64 and 66 to operate in a more efficient manner so as to reduce fuel consumption and emissions. This favorably-stabilized voltage of the DC bus 86 also eliminates unfavorable dynamic loading of the engine/generator sets 62, 64 and 66 so as to enhance the service life of such gensets. The favorably-stabilized voltage on the DC bus 86 also shields the engine/generator sets 62, 64 and 66 from dangerously high step-loading or load-shedding power events that could lead to generator outages and temporary power interruptions to the drilling rig. The AC output of the engine/generator sets 62, 64 and 66 are effectively controlled in a very efficient manner. This can be accomplished without reprogramming or reconfiguring the controllers of the generators. This simplifies the integration of the energy storage system 68 with the architecture of the drilling rig.

It should be further noted that the placement of the energy storage system 68 on a skid, as a separate item, facilitates the ability to "plug and play" the energy storage system with the drilling rig. This allows the ability to completely bypass the energy storage system 68 in the event of any major problem or system failure. It also permits rapid return to a conventional rig operation for added reliability. It is believed that this ability to bypass the energy storage system adds reliability to the drilling rig operation. It is believed that the change-over can be accomplished with the thirty minutes. This would minimize scheduling impacts associated with the production of the drilling rig.

Figure 4:
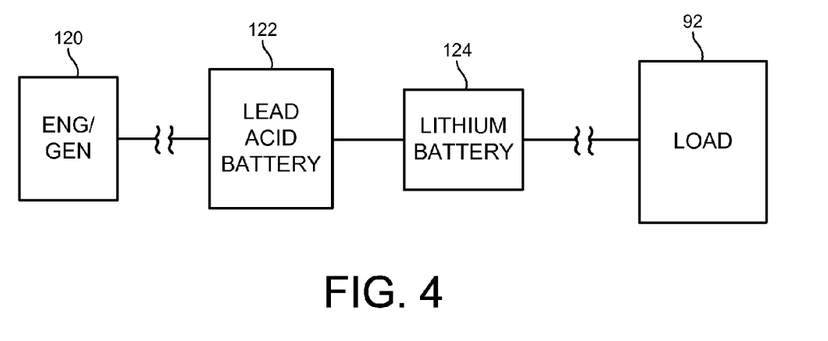
FIG. 4 is a block diagram showing a configuration of batteries as used in the energy storage system of the present invention.

FIG. 4 illustrates a unique configuration of the batteries associated with the energy storage system of the present invention. In particular, it can be seen in FIG. 4 that the engine/generator 120 can be directly connected or interconnected to the lead-acid battery 122. The lead-acid battery 122 is at least a portion of the energy storage system 68 (as shown in FIG. 3). The lead-acid battery can be connected in series to a lithium ion battery 124. The lithium ion battery 124 can be directly connected or interconnected to the load 92. As such, the present invention provides the ability to create a mixture of battery types such that the combined battery types result in a more cost-effective energy storage solution with required cyclic service life, while still meeting the power and energy demands of the drilling rig.

In particular, it is known that lithium ion batteries, such as lithium ion battery 124, have a much higher charge and discharge electrical current rating at higher cyclic operations and high depth-of-discharge compared to lead-acid batteries. As such, the power to the load 92 is supplied directly by the lithium ion battery 124. The high-power, load-dynamic loads are met by the lithium ion battery (or batteries) 124. The lead-acid battery (or batteries) 122 have more continuous, steady-state load demands. Additionally, the lead-acid battery 122 is of a significantly lower cost than the lithium ion battery 124.

As a result of this configuration, the more expensive high-performance lithium ion battery 124 directly supplies the power requirements of the load 92. However, to have an entire array of lithium ion batteries 124 to supply all of the load requirements of the drilling would be extremely expensive. As such, the lithium ion batteries should only be chosen for direct connection to the load 92 so as to maximize battery performance with respect to load. The lead-acid battery 122, being connected in series with the lithium ion battery 124, continually charges the lithium ion battery. As such, there can be an array of lead-acid batteries 122 that serve to supply power to the lithium ion battery 124. The engine/generator set 120 will continually charge the lead-acid batteries 122 so as to assure the lithium ion battery has the necessary power to supply the dynamic loads of the load 92. This can result in a relatively low cost energy storage system 68.

Within the concept of the present invention, the energy storage system 68 can include batteries of various arrays, a flywheel with AC/DC converter, or a capacitor with a DC/DC converter. Additionally, the energy storage system could substitute the use of flywheels and capacitors so as to provide a more cost-effective system with the required cyclic service life, while still meeting the power and energy demands of the drilling rig. As an example, flywheels can be utilized in place of the lead-acid battery 122 so as to supply power to the lithium ion battery 124.

The energy storage system 68 will be computer controlled. The controller 112 can be an electronic system which, through an array of sensors, collects data and is used to safely and reliably control charging and discharging of the energy storage system 68. The energy storage controller 112 monitors the health of the energy storage system through a number of parameters, such as voltage and current input/output, temperatures, state of charge, and other parameters.

The energy storage system of the present invention is designed to provide the proper amount of extra energy and power to yield the specific performance benefits for rig operation. The actual benefits of the energy storage system for dual fuel drilling rigs have been determined through a careful evaluation of actual rig data. This was data extracted from a land-based drilling rig powered by dual fuel engine generators and frequently sampled over four-month period of rig operation. The data includes both power generated and power consumed by the various rig functions.

The dual fuel engine/generator sets have evolved from mechanically-controlled workhorses to an electronically-controlled, intelligent machine. They still require careful control for reliable operation. The parameters for the dual fuel engine/generator sets, operating in an island mode, include kilowatt transducers to provide the generator's realtime, real power signal to the engine control system, sensors for monitoring the combustion conditions (oxygen level), cylinder-mounted detonation sensors, water jacket temperature sensors, air temperature sensors at inlets/outlets of the turbocharger turbines, and air manifold inlet temperatures. Each genset is controlled by this multi-parameter control and is more reliable than depending upon exhaust temperatures alone.

Energy storage reduces the criticality of governor-control of a dual fuel engine/generator. Since the energy storage system permits the generator to operate well within its permissible minimum and maximum loading conditions, loading events are better controlled and less dynamic. Therefore, the energy storage system forces operation toward steady-state conditions enabling the reliability and responsiveness of the dual fuel engine/generator to meet or exceed that of a diesel engine generator.

The energy storage system of the present invention is designed to provide the proper amount of extra energy and power for the operation of the various loads. The energy storage system will assist the generator response with significantly enhanced block loading and load shedding capability with quicker recovery times. The present invention provides improved load management including reliable operation with just a single generator instead of two generators for most operations. The present invention provides better fuel economy and reduced emissions through less use of the resistive load banks and the auxiliary diesel generators. The present invention has better availability of generator power through improved step loading capability and UPS power ride-through for natural gas fuel interruptions. The energy storage system of the present invention assists the rig to operate from wellhead gas so as to further improve cost benefits. The energy storage's improvement to generator load response and UPS power ride-through for fuel interruptions reduces the vulnerability of generator output for variations and wellhead gas flow rate and methane content with the bi-directional electrical power provided by the energy storage system. The reliability and responsiveness of the dual fuel engine generator sets meets or exceeds that of diesel generators, while further providing fuel cost savings and reduced emissions. The present invention provides an anti-blackout aid with the UPS power ride-through for limited operation in the a reduced power mode and critical power mode. The generator can be operated at a somewhat higher load point so as to improve generator efficiency and extended engine life.

Figure 5:
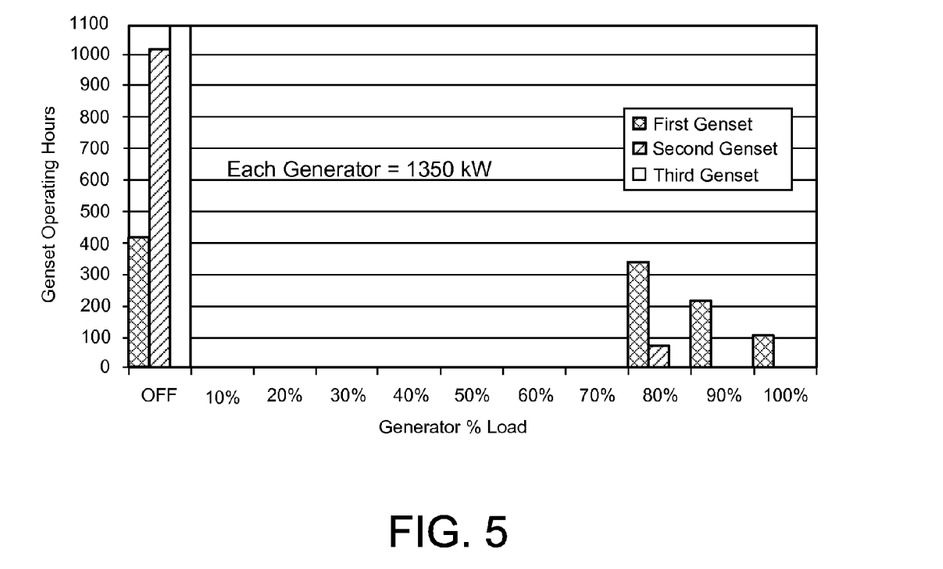
FIG. 5 shows a graph of the variable generator load at 100% speed as utilized in the energy storage system of the present invention.

FIG. 5 illustrates the benefit of energy storage as used on an existing rig. As can be seen in FIG. 5, the entire rig power demand is satisfied mostly by one 1350 kW generator with some assistance from a second 1350 kW generator. The energy storage system provides the needed extra margin to meet rig dynamic loads that reduces the number of generators. This shows that when the generators are still operating at 100% of rated speed (1800 rpm), they will not achieve the goal of extending engine life.

Figure 6:
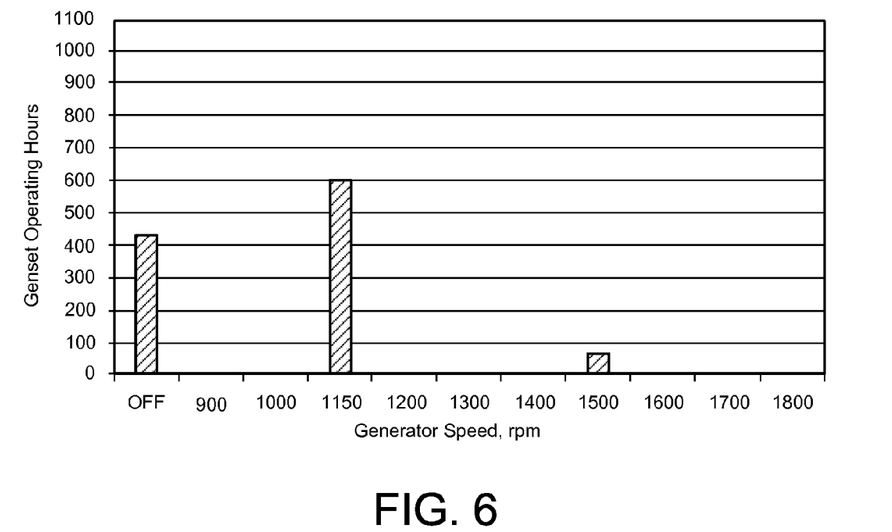
FIG. 6 shows a graph of the variable speed generator with energy storage in accordance the present invention.

FIG. 6 illustrates the operation of the present invention which serves to three 1350 kW generators with a single oversized generator. As such, the entire rig power demand is satisfied with the single generator. The life of the engine/generator is extended by operating at lower speeds while maintaining high percent loads for operational efficiency. It also provide adequate backup power margin with the energy storage system rated with a minimum capacity of 650 kWh and 1 MW continuous and 2 MW peak power rating. The engine/generator is sized to handle the peak power of the rig at 100% speed. However, in order to extend engine life, most operation is at 60% operating speed so as to result in reduced power output. It is also important to note that this reduced power is somewhat higher than the average power demand of the rig. As such, this ensures adequate time-at-power is available to maintain the state-of charge of the energy storage system.

FIG. 6 is particularly applicable for use of 3516 C marine diesel engine. This 3516 C marine diesel engine has an intermittent rating of 2525 kW up to 1800 rpm with a continuous rating of 1100 kW at 1150 rpm. The energy storage system, through power load leveling, ensures that the generator maintains near continuous operation with minimum load interruption or cycling. Also, the power rating of the energy storage system ensures that the maximum power output of the generator at 1500 rpm is at less than 16% of the continuous hours.

Energy storage reduces the criticality of governor control of a dual fuel engine/generator. Since the energy storage system permits the generator to operate well within its permissible minimum and maximum loading conditions, loading events are better controlled and less dynamic. Therefore, the energy storage system forces operation toward steady-state conditions. This enables the dual fuel engine/generator to behave much like a diesel fuel engine/generator. Steadier load demands on the dual fuel engine/generator also enables reliable operation with a increasing fuel ratio of natural gas to diesel. This offers additional fuel savings and emissions reductions.

Figure 7:
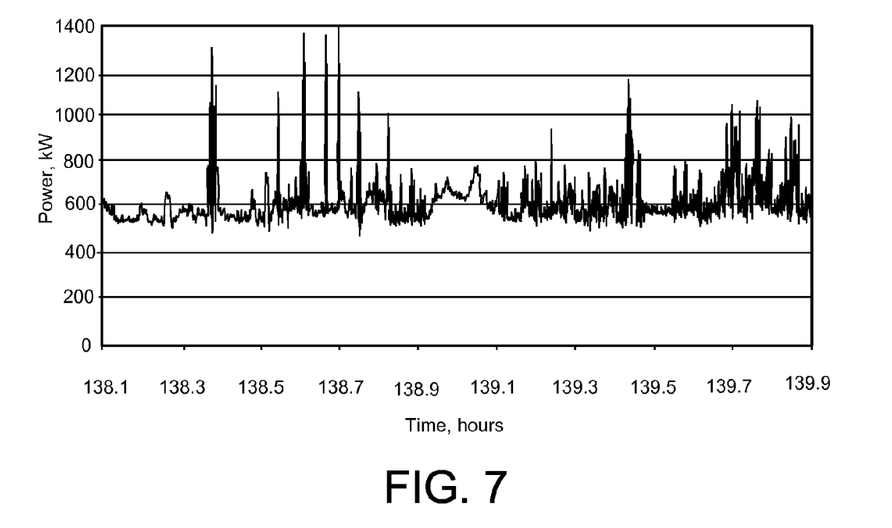
FIG. 7 is a graph showing rig power demand over time.

FIG. 7 is a graph showing the power demands of a conventional rig. The data shown in FIG. 7 was extracted from a land-base drilling rig powered by three 3512 C diesel engine/generators. FIG. 7 shows the total rig power demand for a two hour segment of the data.

In FIG. 7 (without the buffer effect of energy storage), generator controllers must force rapid power changes. The dynamic condition is less supportive of operation with a greater utilization of natural gas or wellhead gas. FIG. 7 shows that with energy storage properly sized in energy capacity and power, the rig power demand is completely satisfied with the operation of only one of the 3512 C diesel generators. The generator output has become much less dynamic and is approaching steady-state loads. This improvement offers loading conditions more suitable for a dual fuel generator, particularly one that uses a high natural gas-to-diesel fuel ratio.

Figure 8:
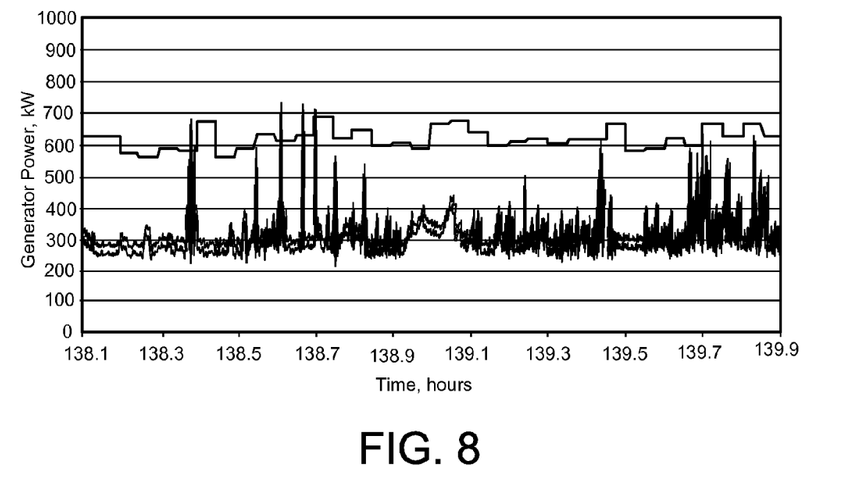
FIG. 8 is a graph showing the ability of a single dual fuel engine/generator with energy storage to accommodate the power demand over time.

In case illustrated in FIG. 8, the energy storage capacity is 1,000 kWh with continuous charge and discharge power ratings 1 MW and 2 MW, respectively. Larger energy storage devices have greater charge/discharge power ratings (kW) and can sustain greater times-at-power power (energy capacity). Therefore, the larger the energy storage device, the greater impact the energy storage device has on regulating generator output in a controlled-steady state manner. Larger energy storage devices also result in smaller depth-of-discharges which extends its service life. The minimizing of this depth-of-discharge also enables the state-of-charge to be maintained at a high value. This preserves a high level of the energy storage capacity to be available for high-power, long duration UPS power ride-through events.

Figure 9:
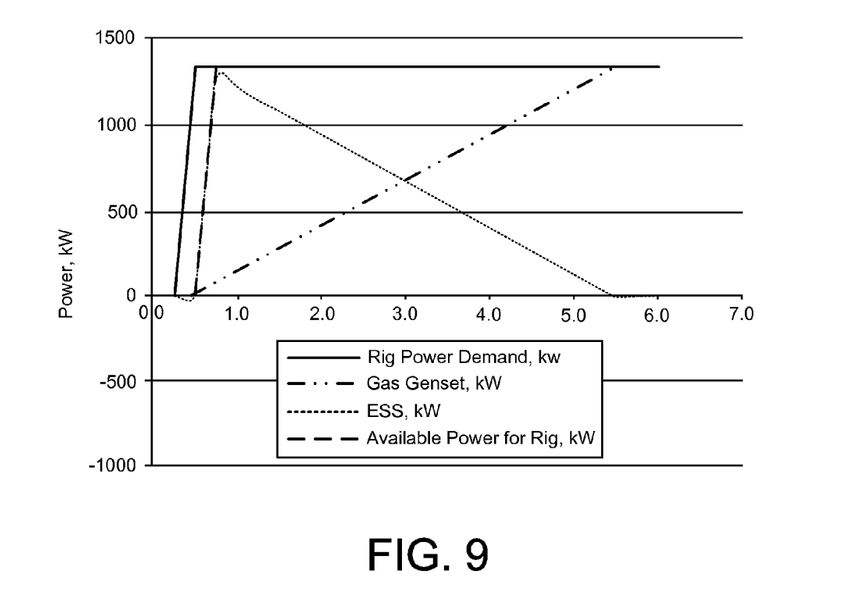
FIG. 9 is a graph of transient response for the dual fuel engine/generator with energy storage for 0% to 100% block load.

The dual fuel engine/generator of the present invention improves the transient response for better block loading and load shedding. FIG. 9 illustrates transient response for the dual fuel engine/generator with energy storage for 0% to 100% block load. The energy storage system is continually cycling between delivering power to meet rig demand and absorbing excess generator power. These functions assist dual fuel engine/generators with power flow during block loading and load shedding under high gas/fuel ratios with the utilization of wellhead gas. With energy storage, the rig demand can be met with an apparent 100% block load response from any load point, including zero. As can be seen in FIG. 9, rig power demand by 1350 kW (rated power of typical rig engine/generator) is nearly instantly supplied from the energy storage system. As the engine/generator ramps up in a controlled and reliable manner, the energy storage power is feathered back.

Figure 10:
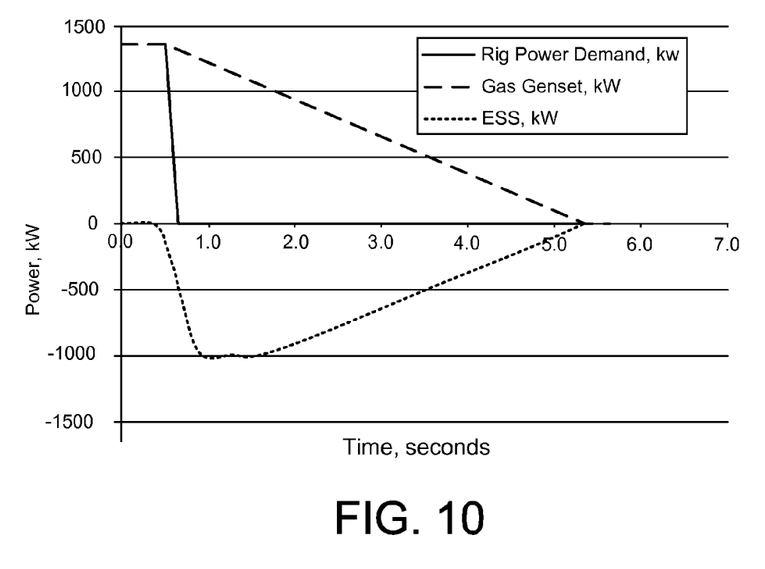
FIG. 10 is a graph showing the transient response for the dual fuel engine/generator with energy storage for 100 to 0% block load.

FIG. 10 illustrates the transient response for the dual fuel engine/generator with energy storage for 100 to 0% block load. In particular, this is the graph associated with power shedding. The present invention allows 100% load shedding to be possible. In this case, the battery system is absorbing (recovering) the excess generator output. This permits the generator to shed its load in a controlled fashion well within allowed limits for reliable operations. Examples shown in FIGS. 9 and 10 are for synchronized operation of two rig engine/generators and the energy storage system. Together, these facilitate a combined effective block load of 1.8 MW. This value is commensurate with the highest values typically observed during drilling in the actual rig data. Energy recovery during load shedding limits the battery's power input to about 1.0 MW in order to keep the battery within permissible charge rates. This is accomplished by diverting power above 1.0 MW to the dynamic brake of the rig. Any energy losses associated with this peak-shaving approach are small and insignificant.

The energy storage system of the present invention is constantly providing bi-directional power flow for improved generator operation through a DC/AC inverter regulating current flow from the battery bank to the DC bus. Power fluctuations much less than one second can take some rig components offline so as to require an extended recovery time. In the event of generator power interruptions, the energy storage system is online to provide UPS-like, power ride-through to maintain power quality. AC bus voltage will be stabilized for these short-term power interruptions and up to peak power of several MWs or more. For example, one benefit of this feature for dual fuel engine/generator operation is to always maintain electrical power to the natural gas skid to prevent fuel interruptions, if so equipped. Additionally, the energy storage's UPS power ride-through, when the rig is using wellhead gas as generator fuel, reduces the vulnerability of generator output to variations in wellhead gas flow rate and methane content.

Figure 11:
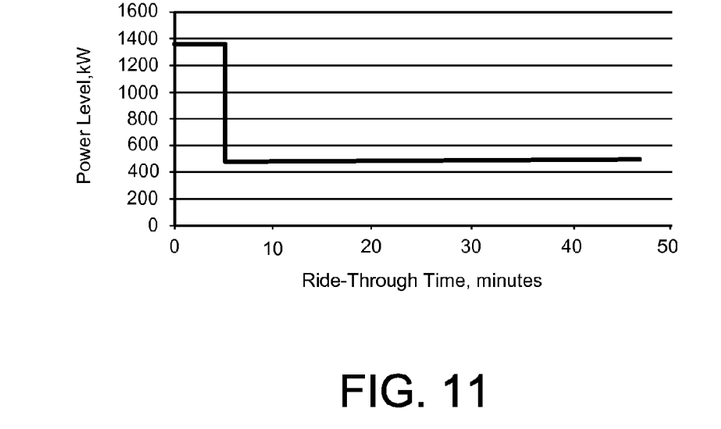
FIG. 11 is a block diagram showing ride-through power as provided by the energy storage system of the present invention.
Figure 12:
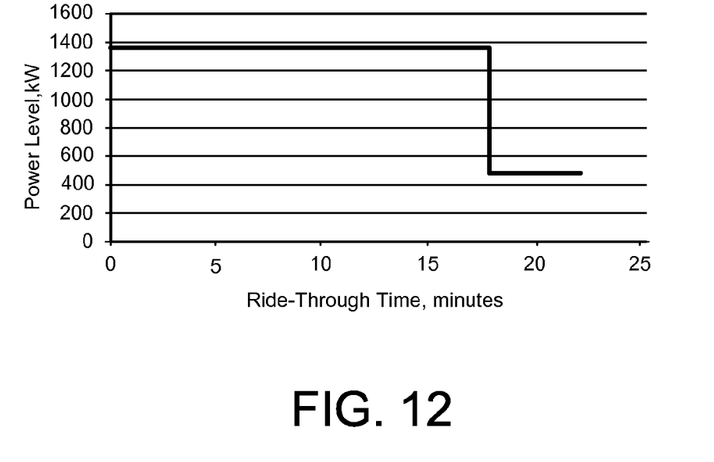
FIG. 12 is a graph showing an alternative availability of ride-through power with the energy storage system of the present invention.

For longer duration events with complete generator failure, limited operation can be sustained. This can be referred to as a "reduced power mode". The energy storage system continues to supply power to specific components, such as rig computer controls, natural gas fuel supply, mud and mixing pumps, rig hotel loads (including lighting), radiator fans, mud pump blower, air conditioning, and air compressors. If the generator failure persists, a more limited scenario, referred to as "critical power operation", provides a lower level of power to preserve critical functions to avoid rig blackout. Critical power operation may include rig computer controls, natural gas fuel supply, rig hotel loads, specific radiator fans, air conditioning, and air compressors. Power levels approach 1350 kW and 500 kW for the reduced power mode and the critical power mode, respectively. These can be supplied by the energy storage system. The battery capacity of the energy storage system is 650 kWh. Given that battery discharge will start from a state-of-charge of 90% and accounting for electrical one-way efficiencies, numerous combinations of ride-though times for each of the modes are possible. FIGS. 11 and 12 represent two possible scenarios. In FIG. 11, the rig goes into a reduced power mode for eighteen minutes so as to allow limited operation for those selected components. Subsequently, for five minutes, the critical power mode is available. In FIG. 12, the rig goes into a reduced power mode for five minutes so as to allow limited operation for those selected components. Then, for forty minutes, the rig goes into the critical power mode so as to be available to bring the generators back online and re-establish rig power.

The foregoing disclosure and description of the invention is illustrative and explanatory thereof. Various changes in the details of the illustrated construction, or in the steps of the described method, can be made within the scope of the appended claims without departing from the true spirit of the invention. The present invention should only be limited by the following claims and their legal equivalents.

I claim:

1. A system for supplying power to a drilling rig, the system comprising:
   an engine/generator having an output line so as to transfer power therefrom;
   an energy storage system connected or interconnected to said output line of said engine/generator such that power from said engine/generator is directed to said energy storage system; and
   a load connected to said energy storage system such that power from said energy storage system is directly transferred to said load, said engine/generator having a capacity greater than an average power requirement of said load.

2. The system of claim 1, said energy storage system having a capacity that is greater than a maximum power requirement of said load.

3. The system of claim 1, said output line of said engine/generator connected to an AC bus, said output line of said energy storage system connected to a DC bus, said load connected to said DC bus.

4. The system of claim 3, further comprising:
   a rectifying means connected between said AC bus and said DC bus for passing DC power from said AC bus to said DC bus.

5. The system of claim 1, said engine/generator being a dual fuel engine/generator.

6. The system of claim 1, said energy storage system comprising at least one battery.

7. The system of claim 6, said battery comprising:
   a first battery connected to said load so as to supply power directly to said load; and
   a second battery connected in series to said first battery, said engine/generator connected to said second battery so as to supply power to said second battery.

8. The system of claim 7, said first battery being a lithium ion battery, said second battery being a lead acid battery.

9. The system of claim 7, said first battery having a capacity of approximately 25% of the power requirements of the load, said second battery having a capacity of approximately 75% of the power requirements of said load.

10. The system of claim 1, said energy storage system selected from the group consisting of a battery, a flywheel and a capacitor.

11. The system of claim 1, said engine/generator operating at least at 80% of a maximum output of said engine/generator.

12. A system for supplying power to a drilling rig, the system comprising:
   an engine/generator having an output line so as to transfer power therefrom;
   an energy storage system connected or interconnected to said output line of said engine/generator such that power from said engine/generator is directed to said energy storage system; and
   a load connected to said energy storage system such that power from said energy storage system is transferred to said load, said engine/generator having a capacity greater than a maximum power requirement of said load.

13. The system of claim 12, said engine/generator being a dual fuel engine/generator.

14. The system of claim 12, said energy storage system comprising at least one battery.

15. The system of claim 14, the battery comprising:
   a first battery connected to said load so as to supply power directly to said load; and
   a second battery connected in series to said first battery, said engine/generator connected to said second battery so as to supply power directly to said second battery.

16. A system for supplying power to a drilling rig, the system comprising:
   an engine/generator having an output line so as to transfer power therefrom;
   an energy storage system connected or interconnected to said output line of said engine/generator such that power from said engine/generator is directed to said energy storage system;
   a battery connected in series with said energy storage system, said engine generator having a capacity greater than an average power requirement of said load; and
   a load connected to said battery such that power from said battery is transferred to said load.

17. The system of claim 16, said energy storage system and said battery having a capacity greater than a maximum power requirement of said load.

18. The system of claim 16, said energy storage system selected from the group consisting of another battery, a flywheel and a capacitor.

19. The system of claim 16, said energy storage system being a lead acid battery, said battery being a lithium ion battery.

* * * * *